Feb. 7, 1961   J. R. MUMMERT   2,970,696
DUAL MANIFOLD FILTER
Filed Feb. 17, 1958
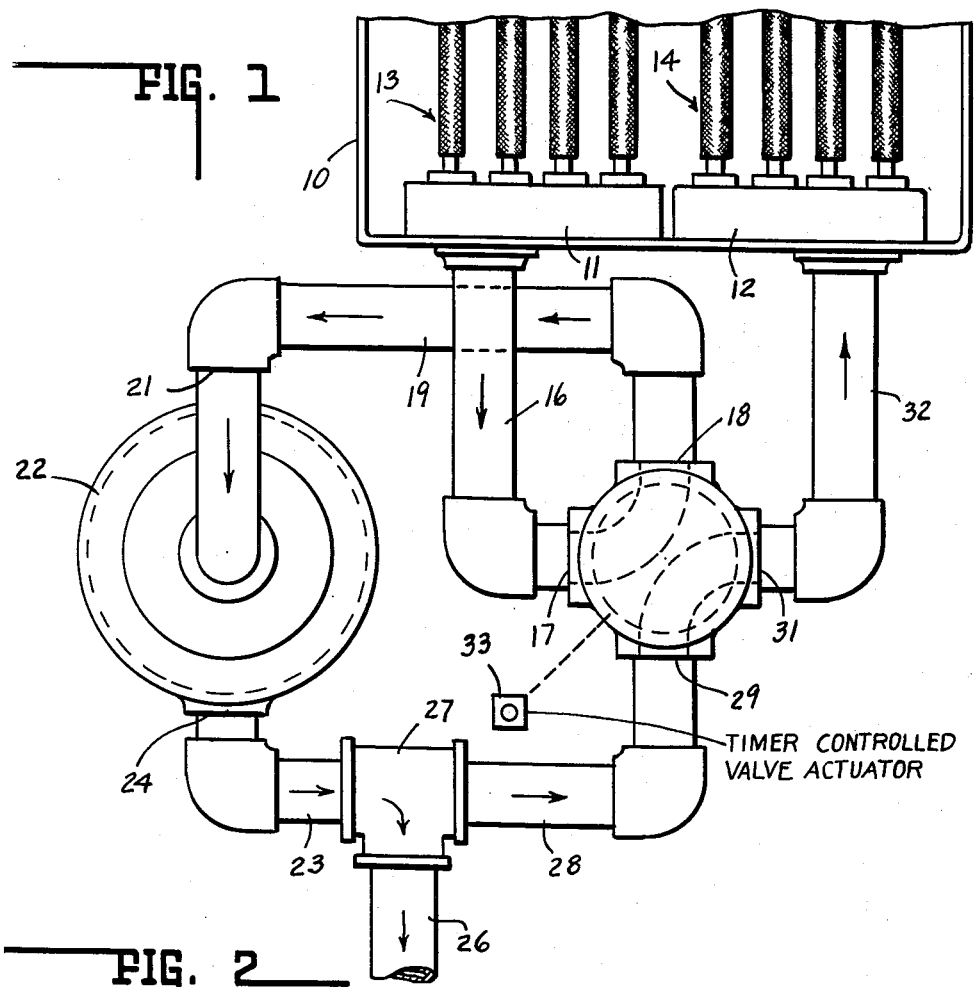
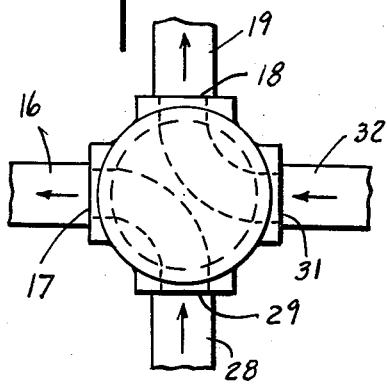
INVENTOR
JOHN R. MUMMERT.
BY
Lockwood, Galt, Woodard & Smith.
ATTORNEYS.

2,970,696
DUAL MANIFOLD FILTER

John R. Mummert, Indianapolis, Ind., assignor, by mesne assignments, to Indiana Commercial Filters Corporation, Lebanon, Ind., a corporation of Indiana Filed Feb. 17, 1958, Ser. No. 715,656

4 Claims. (Cl. 210—138)

This invention relates generally to filtering apparatus and in particular to a fluid filtering apparatus which is self-cleaning, the filtering operation and the filter cleaning operation being carried on simultaneously.

In the filtration of coolant fluids, cutting oils or other liquids requiring removing therefrom of minute particles, various means have been devised for cleaning the filters after they have become caked with particles filtered from the fluid. Various arrangements for backwashing the fouled filters have been used, some of which have required shutdown of the filtering operation while backwashing takes place. Further, some of these attempts at solution of the problem have involved the diversion of the backwashing fluid to a drain where it is lost rather than being recovered by return of the backwashing fluid back to the reservoir of unfiltered liquid.

The present invention provides a filtering arrangement wherein a single filtering tank includes two headers each having a plurality of tubular screen filter units connected thereto. One of the headers is connected to the suction side of a liquid pump through one section of a four-way valve. The flow from the pump is divided and proportioned so that part of the discharge of the pump is returned to the other header, cleaning its attached filter units by backwashing with the remainder of the flow of filtered fluid being directed through the filtered liquid delivery line. A time-controlled actuating means may be used to change, at intervals, the position of the four-way valve to reverse the flow through the filters. Thus, one bank of filter units is undergoing backwashing while the other bank of filter units filters the liquid flow to the pump. The cleaning and filtering processes are continuous with the two banks of filter units alternately performing these functions.

An object of the present invention, therefore, is to provide a filtering apparatus in which dual banks of filtering units mounted within a filter tank are controlled so as to provide a fluid filtering action at one bank of filters and to simultaneously provide a filter backwashing action at the other bank of filters.

A further object of the present invention is to provide an apparatus of the type referred to above in which the backwashing fluid is returned to the reservoir of unfiltered fluid in the filter tank.

The full nature of the invention will be understood from the accompanying drawings and the following description and claims:

Fig. 1 represents a schematic, fragmentary top view of a filter apparatus embodying the present invention.

Fig. 2 illustrates the four-way valve in an alternate position to that shown in Fig. 1.

Referring initially to Figs. 1 and 2, there is shown at 10 a portion of a filter tank having mounted thereon manifolds or headers 11 and 12. The manifold 11 communicates with a bank of filter elements 13 and the manifold 12 similarly communicates with a bank of filter elements 14. The filter elements may take any suitable form, such as screen tubes enclosed by a nylon bag.

The manifold 11 is connected by means of a pipe or liquid line 16 to one port 17 of a four-way valve. In the valve setting shown in Fig. 1, the port 17 communicates with the port 18, which, by means of a pipe 19, communicates with the suction side 21 of a motor-operated liquid pump 22.

A pump discharge line 23 is connected to the liquid pump at 24. A filtered liquid delivery line 26 serves to deliver filtered fluid to a clean liquid or coolant pump (not shown) which feeds fluid to the required location, such as to the cutting fluid distribution system of a machine tool. A T-fitting 27 provides communication between the pump discharge line and a backwash line 28. The capacities of the pump 22 and the clean liquid pump are so related that flow of the filtered fluid delivered by the pump 22 is divided between the backwash line 28 and delivery line 26. For example, twenty gallons per minute may flow through the backwash line and thirty gallons per minute may flow through the delivery line. The backwash line is connected to a port 29 of the four-way valve which, in its position of Fig. 1, communicates with a port 31 of the four-way valve. The port 31 is connected by means of line 32 to the manifold 12.

A conventional timer controlled actuating means indicated schematically at 33 may be used to periodically shift the position of the four-way valve by rotating it 90° clockwise. As will be apparent from Fig. 2, with the four-way valve rotated 90° from its position of Fig. 1, the port 17 will communicate with port 29 and port 18 will communicate with port 31.

In operation, with the four-way valve positioned as shown in Fig. 1, the pump will draw fluid from the filter tank 10 through filter bank 13, the filtered fluid being conveyed through the manifold 11, lines 16 and 19, to the suction side of the pump. The filtered fluid is delivered through the lines 23 and 26, with a portion thereof being diverted to the backwash line 28. By means of ports 29 and 31 in the four-way valve, the diverted portion of the filtered fluid will flow through the line 32 and outwardly from the filter elements making up the filter bank 14 into the reservoir of unfiltered liquid provided by the tank 10. This reverse or backwashing flow through the filter bank 14 will serve to remove from the exterior surfaces of the filter elements any solids or other residue which has accumulated thereon during previous filtering cycles. The filtering operation performed by the filter bank 13 is thus carried on simultaneously with the backwashing operation occurring at the filter bank 14.

After a time interval, the four-way valve is shifted to its position of Fig. 2, thereby reversing the connections to the manifolds 11 and 12. With the four-way valve in its position of Fig. 2, it will be evident that the pump will draw fluid through the filter bank 14 and through the lines 32 and 19. The fluid filtered through the filter bank 14 will be delivered to the line 26 and a portion thereof will be diverted to the backwash line 28 to be delivered by means of line 16 to the manifold 11 and the filter bank 13. The backwashing fluid will flow outwardly through the elements of the filter bank 13 and into the tank 10 of unfiltered liquid. The elements of the filter bank 13 will thus be backwashed while the filter bank 14 filters the fluid delivered through the discharge line 26. It will be evident that by means of the periodic change in position of the four-way valve, a simultaneous backwashing and filtering operation alternately occurs at the filter banks.

It may thus be seen that the present invention provides a filtering apparatus in which filtering and backwashing occur simultaneously with the backwash fluid being returned to the reservoir of unfiltered fluid. No fluid is lost in the backwashing process and the filtering operation is continuous with no loss of filtering time.

The invention claimed is:
1. A liquid filtering apparatus including in combination a filter tank providing a reservoir of unfiltered liquid, dual headers each accommodating a bank of filter elements extending into said tank, a fluid pump, a discharge line for said pump, a delivery line coupled to said discharge line for dispensing filtered liquid, a backwash line communicating with the junction of said discharge line and said delivery line, means including a four-way valve coupled to said backwash line, the suction end of said pump, and said filters, and adapted in one position to connect one of said headers to the suction end of said pump and the other of said headers to said backwash line, and in another position to reverse the connections of said headers, and control means for periodically operating said four-way valve between one or the other of its said positions, whereby upon operation of said pump liquid is alternately filtered through one of said filter tanks as the other filter bank is backwashed with the backwash liquid being returned to said filter tank.

2. A liquid filtering apparatus including in combination a filter tank providing a reservoir of unfiltered liquid, dual filter units within said tank, a fluid pump, a discharge line for said pump, a delivery line coupled to said discharge line for dispensing filtered liquid, a backwash line communicating with the junction of said discharge line and said delivery line, means including a four-way valve coupled to said backwash line, the suction end of said pump, and said filters, and adapted in one position to connect one of said filter units to the suction end of said pump and the other of said filter units to said backwash line, and in another position to reverse the connections of said filter units, and control means for periodically operating said four-way valve between one or the other of its said positions, whereby upon operation of said pump liquid is alternately filtered through one of said filter units as the other filter unit is backwashed with the backwash liquid being returned to said filter tank.

3. A liquid filtering apparatus including in combination a filter tank providing a reservoir of unfiltered liquid, a plurality of filter units within said tank, a fluid pump, a discharge line for said pump, a delivery line coupled to said discharge line for dispensing filtered liquid, a backwash line communicating with the junction of said discharge line and said delivery line, means including a four-way valve coupled to said backwash line, the suction end of said pump, and said filters, and adapted in one position to connect one of said filter units to the suction end of said pump and another of said filter units to said backwash line, and in another position to reverse the connections of said filter units, said four-way valve being adapted to be intermittently operated between one or the other of its said positions, whereby upon operation of said pump liquid is alternately filtered through the said one of said filter units as the said other filter unit is backwashed with the backwash liquid being returned to said filter tank.

4. A liquid filtering apparatus including in combination a filter tank providing a reservoir of unfiltered liquid, a plurality of filter units within said tank, a fluid pump, a discharge line for said pump, a delivery line coupled to said discharge line for dispensing filtered liquid, a backwash line communicating with the junction of said discharge line and said delivery line, and valve means coupled to said backwash line, the suction end of said pump, and said filters for connecting one of said filter units to the suction end of said pump and another of said filter units to said backwash line, and alternatively to reverse the connections of said filter units, said valve means being intermittently operated to pass liquid alternately through the said one of said filter units as the said other filter unit is backwashed with the backwash liquid being returned to said filter tank.

References Cited in the file of this patent

UNITED STATES PATENTS

| | | |
|---|---|---|
| 535,366 | Field | Mar. 12, 1895 |
| 713,717 | Thompson | Nov. 18, 1902 |
| 1,001,027 | Hauer | Aug. 22, 1911 |
| 2,095,447 | Lentz | Oct. 12, 1937 |
| 2,494,534 | Armstrong et al. | Jan. 17, 1950 |